United States Patent
Abrari et al.

(10) Patent No.: US 10,837,361 B2
(45) Date of Patent: Nov. 17, 2020

(54) GAS TURBINE ENGINE INLET

(71) Applicant: PRATT & WHITNEY CANADA CORP., Longueuil (CA)

(72) Inventors: Farid Abrari, Mississauga (CA); Peter Townsend, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 89 days.

(21) Appl. No.: 16/177,765

(22) Filed: Nov. 1, 2018

(65) Prior Publication Data

US 2019/0072034 A1 Mar. 7, 2019

Related U.S. Application Data

(62) Division of application No. 14/493,758, filed on Sep. 23, 2014, now Pat. No. 10,145,301.

(51) Int. Cl.
*F02C 7/055* (2006.01)
*F02K 3/06* (2006.01)

(52) U.S. Cl.
CPC ............. *F02C 7/055* (2013.01); *F02K 3/06* (2013.01); *F05D 2240/307* (2013.01); *F05D 2250/182* (2013.01); *F05D 2250/51* (2013.01); *F05D 2250/71* (2013.01)

(58) Field of Classification Search
None
See application file for complete search history.

(56) References Cited

U.S. PATENT DOCUMENTS

| | | | |
|---|---|---|---|
| 3,333,794 A | 8/1967 | Lewis | |
| 3,610,262 A | 10/1971 | Wise et al. | |
| 3,819,008 A | 6/1974 | Evans et al. | |
| (Continued) | | | |

FOREIGN PATENT DOCUMENTS

| | | |
|---|---|---|
| CN | 101922312 | 12/2010 |
| CN | 103835810 | 6/2014 |
| (Continued) | | |

OTHER PUBLICATIONS

Opposition to EP Patent 3026240—English Translation.

*Primary Examiner* — Kenneth J Hansen
*Assistant Examiner* — Jason Fountain
(74) *Attorney, Agent, or Firm* — Norton Rose Fulbright Canada LLP

(57) ABSTRACT

An inlet for a turbofan engine, including an inlet wall surrounding an inlet flow path. The inlet wall extends axially from an upstream end to a downstream end adjacent the fan. The inlet wall has a shape defining a plurality of teeth circumferentially spaced around the inlet. The teeth extend axially and project radially inwardly toward the central longitudinal axis. A central portion of the inlet flow path has a cross-sectional dimension measured diametrically between opposed teeth, the cross-sectional dimension varying along the axial direction. The central portion defines a geometric throat at a minimum value of the cross-sectional dimension. The inlet wall is shaped so that the geometric throat is axially spaced from the upstream end and the downstream end. A gas turbine engine and a method of shielding tips of fan blades from impact by an object having a predetermined minimum dimension are also discussed.

14 Claims, 6 Drawing Sheets

(56) References Cited

U.S. PATENT DOCUMENTS

| | | | |
|---|---|---|---|
| 3,843,277 A | * | 10/1974 | Ehrich .................... F02C 7/045 |
| | | | 415/119 |
| 3,937,590 A | | 2/1976 | Mani |
| 4,076,454 A | | 2/1978 | Wennerstrom |
| 4,104,002 A | * | 8/1978 | Ehrich .................. F04D 29/663 |
| | | | 137/15.1 |
| 4,254,619 A | | 3/1981 | Giffin et al. |
| 4,354,346 A | | 10/1982 | Wooding |
| 4,354,804 A | | 10/1982 | Cruzen |
| 4,844,692 A | | 7/1989 | Minkkinen et al. |
| 5,275,531 A | | 1/1994 | Roberts |
| 5,365,731 A | | 11/1994 | Nikkanen et al. |
| 5,474,417 A | | 12/1995 | Privett et al. |
| 5,489,186 A | | 2/1996 | Yapp et al. |
| 5,607,284 A | | 3/1997 | Byrne et al. |
| 5,628,622 A | | 5/1997 | Thore et al. |
| 5,762,470 A | | 6/1998 | Gelmedov et al. |
| 6,139,259 A | | 10/2000 | Ho et al. |
| 6,179,551 B1 | | 1/2001 | Sathianathan et al. |
| 6,227,794 B1 | | 5/2001 | Wojtyczka et al. |
| 6,508,624 B2 | | 1/2003 | Nadeau et al. |
| 6,514,039 B1 | | 2/2003 | Hand |
| 6,540,478 B2 | | 4/2003 | Fiala et al. |
| 6,655,632 B1 | | 12/2003 | Gupta et al. |
| 7,118,331 B2 | | 10/2006 | Shahpar |
| 7,444,802 B2 | | 11/2008 | Parry |
| 7,665,964 B2 | | 2/2010 | Taylor et al. |
| 7,797,944 B2 | | 9/2010 | Morford |
| 7,861,823 B2 | | 1/2011 | Prasad |
| 7,914,251 B2 | | 3/2011 | Pool et al. |
| 8,046,915 B2 | | 11/2011 | Xie et al. |
| 8,186,942 B2 | | 5/2012 | Haas |
| 8,366,047 B2 | | 2/2013 | Euvino, Jr. et al. |
| 8,403,624 B2 | | 3/2013 | Xie et al. |
| 8,461,713 B2 | | 6/2013 | Sammy |
| 8,540,490 B2 | | 9/2013 | Ramakrishnan et al. |
| 8,636,464 B2 | | 1/2014 | Bottome |
| 8,756,909 B2 | | 6/2014 | Avery |
| 9,091,174 B2 | | 7/2015 | Bagnall |
| 9,623,979 B2 | * | 4/2017 | Rouyre .................. B64D 33/02 |
| 2011/0164967 A1 | | 7/2011 | Elorza Gomez et al. |
| 2012/0087787 A1 | | 4/2012 | Brown |
| 2012/0240594 A1 | | 9/2012 | Shamara |
| 2012/0263587 A1 | | 10/2012 | Hergt et al. |
| 2013/0045370 A1 | | 2/2013 | Aho et al. |
| 2013/0153456 A1 | | 6/2013 | Zhu et al. |
| 2013/0202424 A1 | | 8/2013 | Lussier et al. |
| 2013/0266439 A1 | | 10/2013 | Rubak et al. |
| 2014/0010638 A1 | | 1/2014 | Perrot et al. |
| 2014/0030071 A1 | | 1/2014 | Leslie et al. |
| 2014/0219792 A1 | | 8/2014 | Topol et al. |
| 2014/0286768 A1 | | 9/2014 | Boniface et al. |
| 2015/0260051 A1 | | 9/2015 | Gallagher et al. |
| 2015/0360790 A1 | * | 12/2015 | Rouyre .................. B64D 33/02 |
| | | | 244/53 B |
| 2016/0084162 A1 | | 3/2016 | Abrari et al. |
| 2016/0084256 A1 | | 3/2016 | Yu et al. |
| 2016/0084265 A1 | | 3/2016 | Yu et al. |
| 2016/0186690 A1 | | 6/2016 | Florea et al. |
| 2016/0312618 A1 | | 10/2016 | Macchia |
| 2016/0312641 A1 | | 10/2016 | Macchia |
| 2017/0145840 A1 | | 5/2017 | Di Mare et al. |
| 2017/0145959 A1 | | 5/2017 | Baralon |
| 2017/0147741 A1 | | 5/2017 | Di Mare et al. |
| 2017/0152861 A1 | | 6/2017 | Japikse |
| 2017/0248156 A1 | | 8/2017 | Parker et al. |

FOREIGN PATENT DOCUMENTS

| | | |
|---|---|---|
| DE | 102012003902 | 6/2013 |
| EP | 1956247 | 8/2008 |
| GB | 623142 | 5/1949 |
| GB | 2405184 | 2/2005 |
| JP | 2000095195 | 4/2000 |
| WO | 9809066 | 3/1998 |
| WO | 02/29224 | 4/2002 |
| WO | 20140023891 | 2/2014 |

* cited by examiner

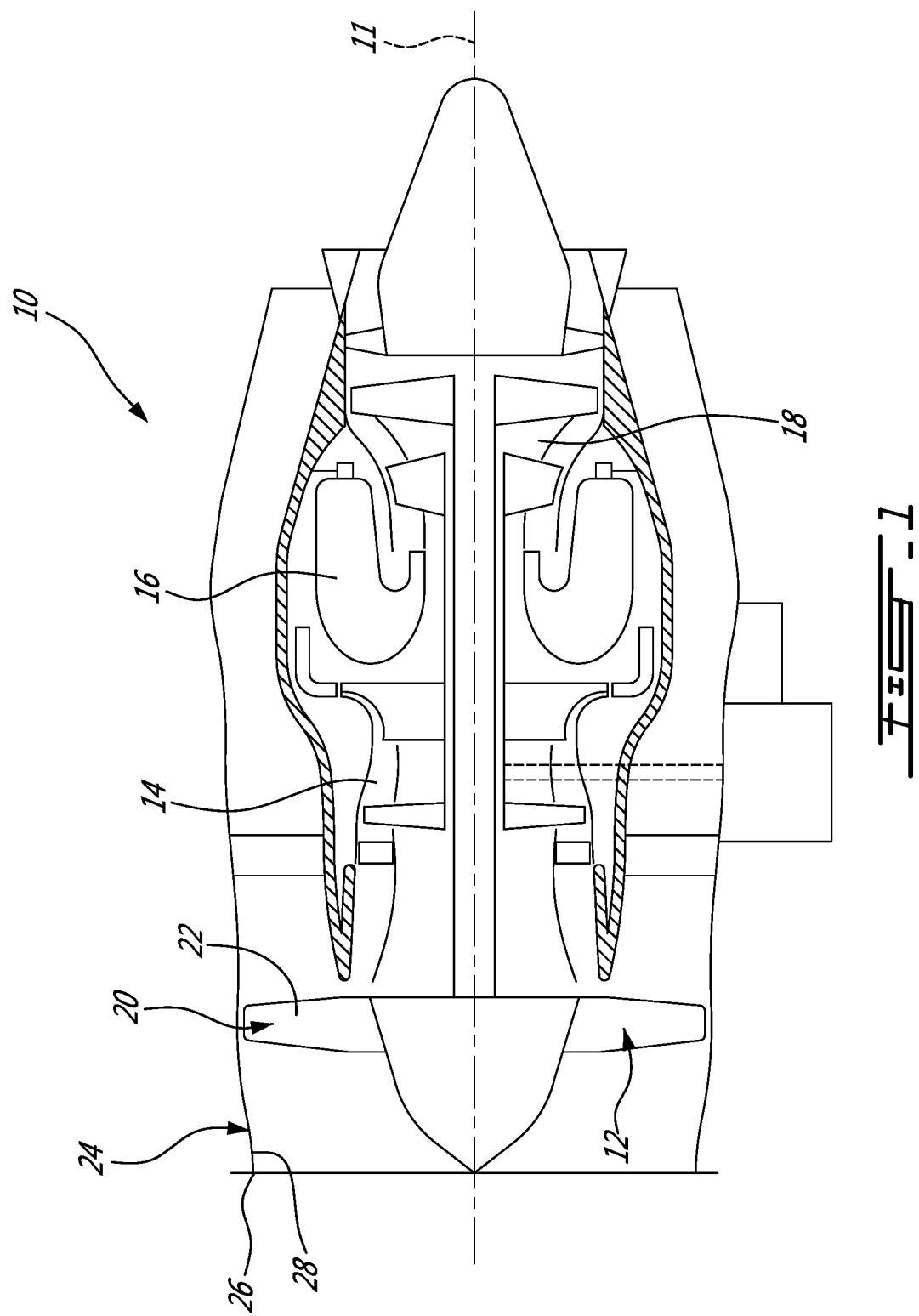

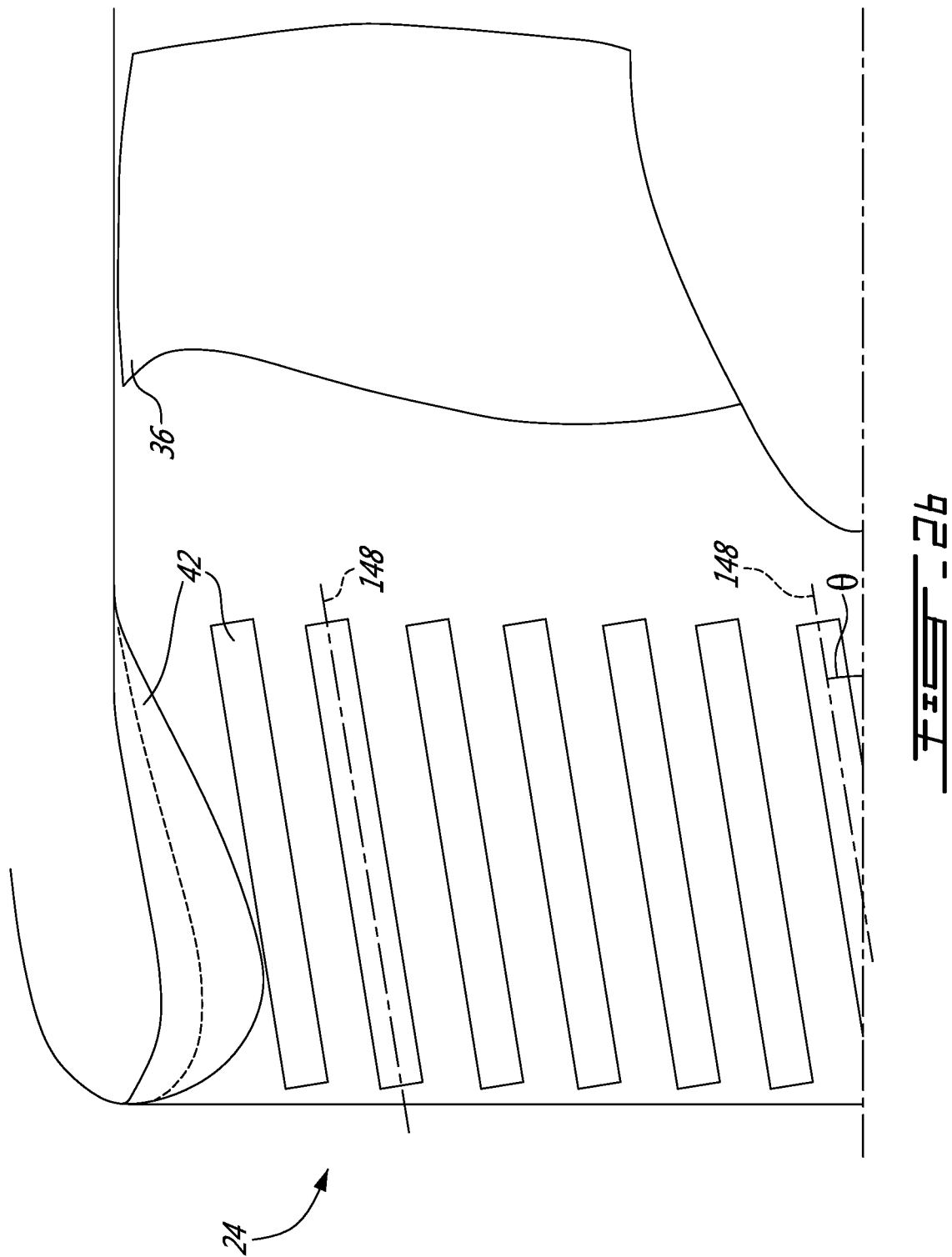

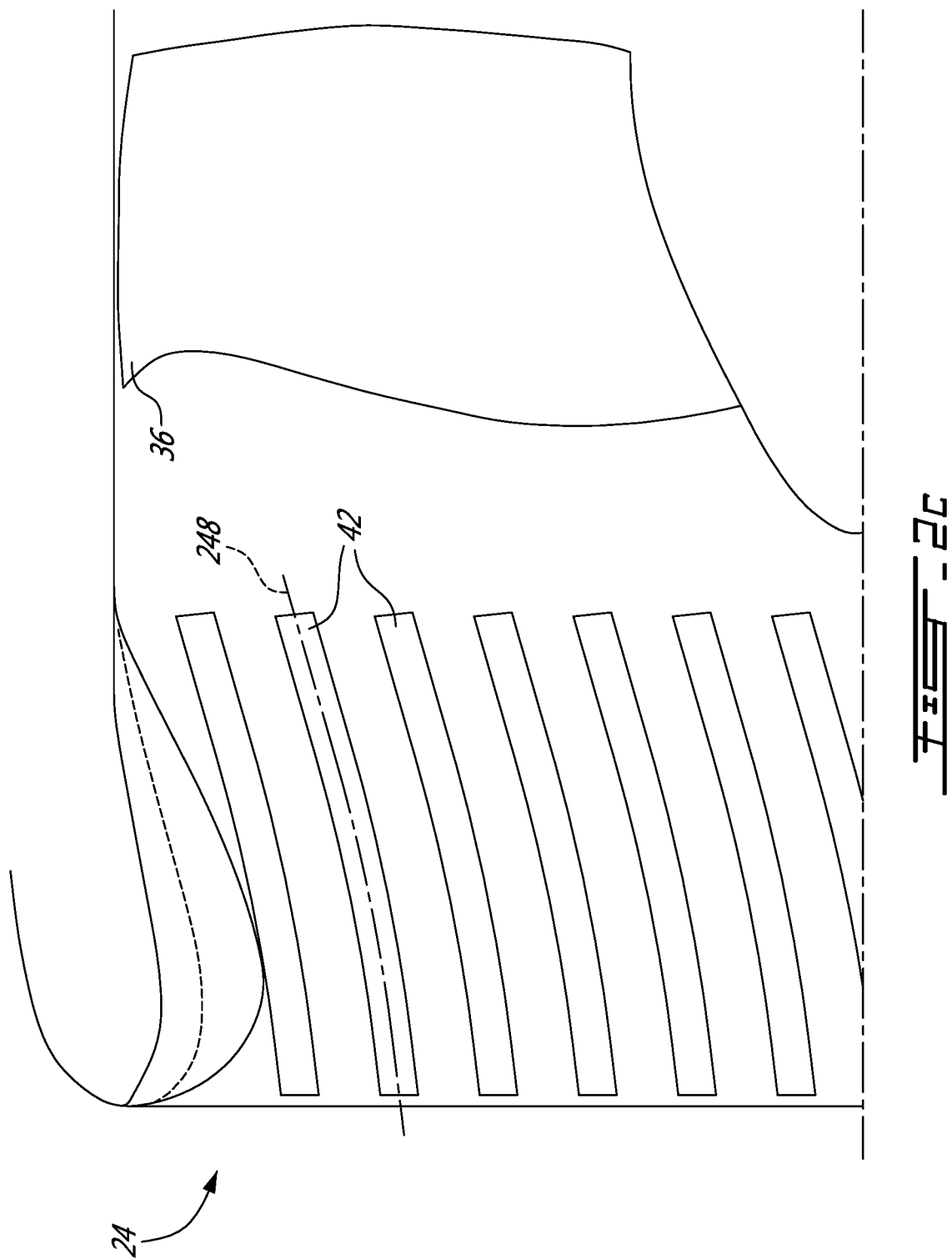

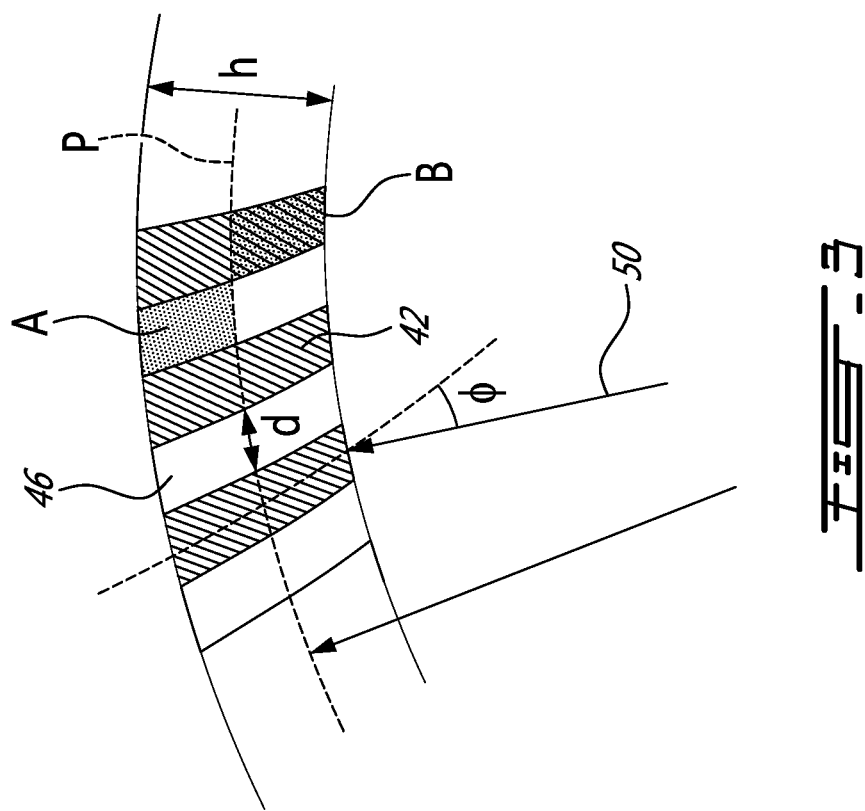

GAS TURBINE ENGINE INLET

RELATED APPLICATION

This application is a divisional of U.S. patent application Ser. No. 14/493,758 filed on Sep. 23, 2014, the content of which is hereby incorporated by reference.

TECHNICAL FIELD

The application relates generally to gas turbine engines and, more particularly, to inlets for turbofan engines.

BACKGROUND OF THE ART

The leading edge of a fan blade is generally the thinnest portion of the fan blade, and the area of the blade most exposed to foreign object impact. The tip section of the blade leading edge, being the least structurally supported area of the blade, is generally most at risk of damage, for example due to foreign object damage (FOD).

Although the inlet of a turbofan engine may be provided with a reduced diameter rounded throat, which may shield the blade tips from FOD, the minimum throat diameter is limited by mass flow constraints, which prevent its restriction beyond a certain choke limit. Such limit may prevent the throat from being sized to adequately protect the blade tips. Accordingly, it is generally necessary to increase the thickness of the blade tips to meet the required foreign object damage requirements. Increasing the thickness of the blade tips typically leads to significant losses in fan efficiency, as the tips are usually critical regions of the blades from an aerodynamic perspective.

SUMMARY

In one aspect, there is provided a turbofan engine, the engine comprising: a propulsive fan; and an inlet upstream of the fan having an axially extending central longitudinal axis, the inlet including an inlet wall surrounding an inlet flow path, the inlet wall extending axially from an upstream end to a downstream end adjacent the fan, the inlet wall having a shape defining a plurality of teeth circumferentially spaced around the inlet, the teeth extending axially, the teeth projecting radially inwardly toward the central longitudinal axis, a central portion of the inlet flow path having a cross-sectional dimension measured diametrically between opposed ones of the teeth, the cross-sectional dimension varying along the axial direction, the central portion defining a geometric throat at a minimum value of the cross-sectional dimension, the inlet wall shaped so that the geometric throat is axially spaced from the upstream end and the downstream end.

In another aspect, there is provided a gas turbine engine comprising: a rotor including an array of circumferentially spaced blades configured for rotation; and an annular inlet including an axially extending wall having a central longitudinal axis, the wall having an upstream end located upstream of the blades, a downstream portion surrounding the blades in proximity of tips of the blades, and an inlet wall portion extending axially from the upstream end to the downstream portion, the inlet wall portion defining an inlet flow path for directing air to the fan, the inlet wall portion having a shape defining a plurality of teeth circumferentially spaced around the inlet, the teeth extending axially, the teeth projecting radially inwardly toward the central longitudinal axis, a central portion of the inlet flow path having a cross-sectional dimension measured diametrically between opposed ones of the teeth, the cross-sectional dimension varying along the axial direction, the central portion defining a geometric throat at a minimum value of the cross-sectional dimension, the inlet wall shaped so that the geometric throat is axially spaced from the upstream end and the blades.

In a further aspect, there is provided a method of shielding tips of fan blades of a gas turbine engine from impact by an object having a predetermined minimum dimension, the method comprising: determining a required open cross-sectional area in an air inlet located upstream of the fan blades based on flow characteristics of the engine, the air inlet being defined by an inlet wall surrounding a flow path communicating with the fan blades; determining a reference circle having a cross-sectional area corresponding to the required open cross-sectional area; offsetting a circumferential part of the inlet wall radially inwardly with respect to the reference circle to define a plurality of circumferentially spaced apart teeth protruding into the reference circle; offsetting the remaining circumferential part of the inlet wall radially outwardly with respect to the reference circle to define a plurality of circumferentially spaced apart valleys alternating with the teeth and extending out of the reference circle; wherein the teeth are defined spaced apart by a circumferential distance smaller than the predetermined minimum dimension; and wherein the teeth and valleys are sized so that a cross-sectional area of a lobed area surrounded by the inlet wall corresponds to the required open cross-sectional area.

DESCRIPTION OF THE DRAWINGS

Reference is now made to the accompanying figures in which:

FIG. 1 is a schematic cross-sectional view of a gas turbine engine;

FIGS. 2a, 2b and 2c are schematic cross-sectional views of part of a fan and inlet of a gas turbine engine such as shown in FIG. 1, in accordance with particular embodiments;

FIG. 3 is a schematic front view of part of the inlet, in accordance with a particular embodiment;

DETAILED DESCRIPTION

Figure 2A:
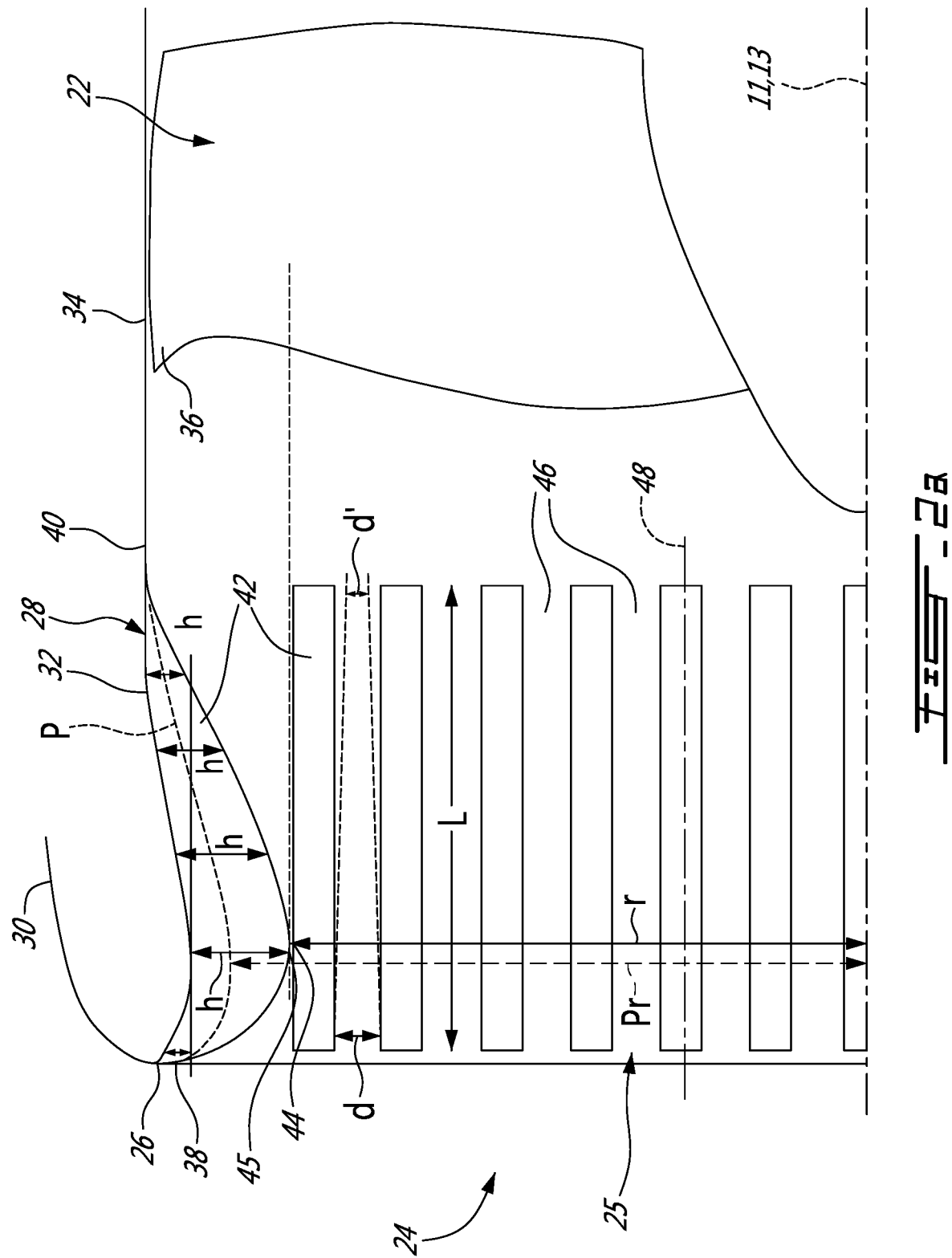

FIG. 1 illustrates a gas turbine engine 10 of a type preferably provided for use in subsonic flight, generally comprising in serial flow communication a propulsive fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12 has at least one rotor 20, the rotor 20 including an array of circumferentially spaced blades 22 configured for rotation about a central longitudinal axis 11 of the engine 10. The engine 10 has an inlet 24 directing the ambient air to the fan 12. The inlet 24 generally includes an annular inlet lip 26 and an inner wall 28.

Referring to FIG. 2a, the inlet 24 has a central longitudinal axis 13. In the embodiment shown, the inlet lip 26 is concentric with the engine 10 and the central longitudinal axis 13 of the inlet 24 corresponds to the central longitudinal axis 11 of the engine 10. Alternately, the two axes 11, 13 may be offset from one another.

In the embodiment shown, the inlet 24 is defined by a casing including an outer wall 30 surrounding the inner wall 28, the inner and outer walls 28, 30 being connected along the inlet lip 26. The inner wall 28 includes an inlet wall portion or inlet wall 32 located upstream of the fan blades 22, and a downstream portion 34 extending from the inlet wall portion 32. The downstream portion 34 surrounds the fan blades 22 so that the fan blade tips 36 are located in proximity of the inner wall 28, and defines the flow path through which the fan blades 22 rotate. The inlet wall portion 32 defines and surrounds the inlet flow path through which the air passes to reach the fan blades 22. The inlet wall portion 32 thus has an upstream end 38 at the inlet lip 26 and a downstream end 40 at the transition with the downstream portion 34.

The inlet wall or inlet wall portion 32 is shaped to define a plurality of teeth 42 circumferentially spaced around the inlet 24, which in a particular embodiment are regularly spaced apart around its circumference. It can be seen that the teeth 42 extend axially along a length L, from the upstream end 38 to the downstream end 40 of the inlet wall portion 32. The teeth 42 projecting radially inwardly toward the central longitudinal axis 13. The radially innermost point of the teeth 42 surround a central tooth-free portion 25 of the inlet flow path, corresponding to the central portion of the inlet flow path where a foreign object too large to penetrate between the teeth 42 can be ingested. The central portion 25 (in which a nose cone may extend) has a cross-sectional dimension 2r measured diametrically between opposed teeth 42, with r being defined as the radial distance between the radially innermost point of the teeth 42 and the central longitudinal axis 13. The cross-sectional dimension 2r varies along the axial direction. The geometric throat 44 of the inlet 24, defined at the axial location where the cross-sectional dimension 2r is smallest, is located at an intermediate position between the upstream end 38 and the downstream end 40 of the inlet wall portion 32, such that the geometric throat 44 is axially spaced from the upstream and downstream ends 38, 40.

The space between the adjacent teeth 42 defines a plurality of spaced apart valleys 46 alternating with the teeth 42. The cross-section of the flow path surrounded by the inlet wall portion 32 has a lobed shape, including the central portion 25 and the cross-section of the valleys 46 defined between the teeth 42. The cross-sectional area of the inlet flow path surrounded by the inlet wall portion 32 also varies along the axial direction. The aerodynamic throat 45 is defined a minimum value of this cross-sectional area. In a particular embodiment, the inlet wall portion 32 is shaped so that the geometric throat 44 is axially spaced from the aerodynamic throat 45. In a particular embodiment, the use of the teeth 42 and valleys 46 thus allows to decouple the position of the geometric and aerodynamic throats 44, 45, which may provide increased flexibility in the design of the inlet 24.

The teeth 42 have a radially defined height h, defined as the radial distance between the radially innermost point of the teeth 42 and the radially outermost point of the valleys 46. In the embodiment shown, the height h increases from a minimum, in a particular embodiment 0, at the inlet lip 26 to a maximum, and then decreases from the maximum to a minimum, in a particular embodiment 0, at the downstream end 40 of the inlet wall portion 32. In a particular embodiment, the maximum height h is defined at the geometric throat 44.

As mentioned above, turbofan inlets typically have a shape (circular, partly circular with flattened section, or other smooth or rounded shape, i.e. without teeth) with a reduced diameter at the geometric throat 44 (which in the prior art also corresponds to the aerodynamic throat 45). FIG. 2a shows in dotted lines an exemplary outline of a prior art rounded inlet profile P sized according to the minimum possible open cross-sectional area, in consideration of the flow characteristics of the engine 10; methods to determine the minimum open cross-sectional area are well known in the art and will not be repeated herein. In a particular embodiment, the teeth 42 and valleys 46 of the inlet 24 are sized and spaced such that the cross-sectional area of the lobed cross-section surrounded by the inlet wall portion 32 at the geometric throat 44 and/or the aerodynamic throat 45 is similar or equal to the cross-sectional area surrounded by the throat defined by the prior art rounded inlet profile P. In a particular embodiment, the teeth 42 and valleys 46 are sized and spaced such that the cross-sectional area of the lobed cross-section surrounded by the inlet wall portion 32 along the length L is similar or equal to the cross-sectional area surrounded by the prior art inlet profile P along the length L. The teeth 42 thus define a reduced free radius r of the throat 44 i.e. the radius of the central portion 25, which in a particular embodiment is circular, bordered by the teeth 42 and through which large foreign objects can freely be ingested, while the valleys 46 provide open space around this opening to maintain the required open cross-sectional area. In a particular embodiment, the free radius r at the geometric throat 44 defined by the teeth 42 is from 2% to 20% smaller than the radius Pr of the prior art throat providing the same open cross-sectional area at the geometric throat 44. In another embodiment, where regulations require the engine to be tested to resist ingestion of a given number of birds with respect to the cross-sectional area of the inlet flow path, the free radius r at the geometric throat 44 defined by the teeth 42 is selected such that the cross-sectional area of the central portion 25 corresponds to a reduced number of birds required in the test, for example by 1, as compared with the cross-sectional area of the lobed area surrounded by the inlet wall portion 32.

In a particular embodiment, the fan blade tips 36 are thus shielded from impact by foreign objects in accordance with the following. The required open cross-sectional area in the inlet 24 (e.g. at the aerodynamic throat 45) is determined based on flow characteristics of the engine 10, and a reference circle having an area corresponding to the required open cross-sectional area is determined. A circumferential part of the inlet wall portion 32 is offset radially inwardly with respect to the reference circle to define the teeth 42 protruding into the reference circle, and the remaining circumferential part of the inlet wall is offset radially outwardly with respect to the circumference to define the valleys 46 extending out of the reference circle. The teeth 42 and valleys 46 are sized to maintain the required open cross-sectional area, i.e. to surround an area equivalent to that of the reference circle.

Accordingly, in a particular embodiment and as illustrated by FIG. 3, the cross-sectional area A of one valley 46 outward of the prior art inlet profile P or reference circle is similar or equal to the cross-sectional area B of the tooth 42 inward of the prior art inlet profile P or reference circle, such that the added open area from the valleys 46 compensates for the obstruction of the teeth 42 to maintain the required open cross-sectional area. In a particular embodiment, the valleys 46 extend radially outwardly at the maximum radius possible with respect to structural considerations, and with respect to maximum possible size for the outer wall 30 with minimal distance to maintain between the outer wall 30 and the inner wall 28, which allows for a maximal protrusion of the teeth 42 into the flow path while maintaining the necessary minimal open cross-sectional area.

Referring back to FIG. 2a, in a particular embodiment, the teeth 42 are axially straight, and each extends axially along a straight direction 48 parallel to the central longitudinal axis 13, i.e. they have a central longitudinal axis parallel to that of the inlet 24. Other orientations are also possible for the teeth 42.

For example, as shown in FIGS. 2b and 2c, each tooth 42 may be axially inclined, i.e. may extend axially along a direction 148, 248 non-parallel to the central longitudinal axis 13. This direction 148, 248, corresponding to the central longitudinal axis of each tooth 42, may extend at a non-zero angle θ (see FIG. 2b) with respect to the central longitudinal axis 13 of the inlet 24; in a particular embodiment, this angle θ is about 20°. The angled teeth 42 may be straight along their length, i.e. extend along a straight direction 148 defined by a straight longitudinal axis (FIG. 2b) or curvilinear along their length, i.e. extend along a curved direction 248 defined by a curved longitudinal axis (FIG. 2c).

In a particular embodiment, the axial inclination of the teeth 42 blocks a direct line of sight between adjacent teeth 42 along a flow direction of the flow path. Such a configuration may protect the fan blade tips 36 from impact from smaller foreign objects (e.g. ice, hail) small enough to penetrate between adjacent teeth 42, by deflecting the foreign objects or breaking them into smaller particles as they impact the side walls between the teeth 42. In a particular embodiment, such a configuration may also advantageously generate a pre-swirl in the air reaching the fan blade tips 36, which may improve the efficiency of the fan 12. In a particular embodiment, such a configuration may also reduce the noise generated by the fan 12 and engine 10.

Referring back to FIG. 2a, the teeth 42 are circumferentially spaced apart by a distance d, which is selected according to the dimensions of the smallest object (e.g. bird) that needs to be blocked. For example, in a particular embodiment, the distance d is selected to be 3.5 inches or less. In the embodiments of FIGS. 2a-2c, the circumferential distance d between adjacent teeth 42 is shown as being constant across the axial length L of the teeth 42. In another embodiment (an example of which is shown in dotted lines in FIG. 2a), the circumferential distance d between adjacent teeth 42 decreases as the teeth extend axially toward the downstream end 40—i.e. the teeth 42 are further apart near the upstream end 38 (distance d) than near the downstream end 40 (distance d'). In a particular embodiment, such a configuration allows for some foreign objects to be trapped between the teeth 42, thus preventing them from reaching the fan 12.

In a particular embodiment and with reference to FIG. 3, the circumferential distance d between the teeth 42 decreases as the teeth 42 extend radially inwardly. That is, the circumferential distance d is larger along the outer circumference of the inlet wall portion 32 (i.e. outwardly of the prior art inlet profile P) than along the inner circumference of the inlet wall portion 32 (i.e. inwardly of the prior art inlet profile P). In one embodiment, such a configuration may improve the ability of the teeth 42 to trap soft foreign objects as they enter the engine 10 or lock in any ice build-up between the teeth 42. Alternately, the circumferential distance d between the teeth 42 may be the same at any radial distance from the central longitudinal axis 13, for a given axial position.

In the embodiment shown in FIG. 3, the teeth 42 are both curved and inclined with respect to the radial direction 50. Each of the teeth 42 extends radially along a direction extending at a non-zero angle with respect to a radial line intersecting the central longitudinal axis 13. Thus, in a cross-section defined in a plane extending perpendicularly to the central longitudinal axis 13 (plane of FIG. 3), the radial central axis 52 of each tooth 42 extends at a non-zero angle Φ with respect to the radial direction 50, e.g. with respect to a radius line extending from the central longitudinal axis 13. In this embodiment, the teeth are curvilinear along their height, i.e. the radial central axis 52 of each tooth 42 is curved.

The angle Φ may vary across the axial length L of the teeth 42; in a particular embodiment, this may improve the ability to trap soft foreign objects between the teeth 42.

Figure 4A:
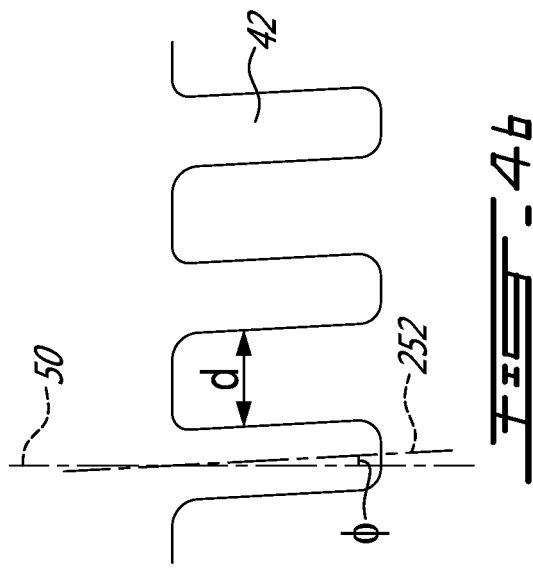
FIGS. 4a, 4b, 4c and 4d are schematic front views of teeth profiles for the inlet in accordance with particular embodiments, shown as extending linearly instead of annularly for improved clarity.
Figure 4B:
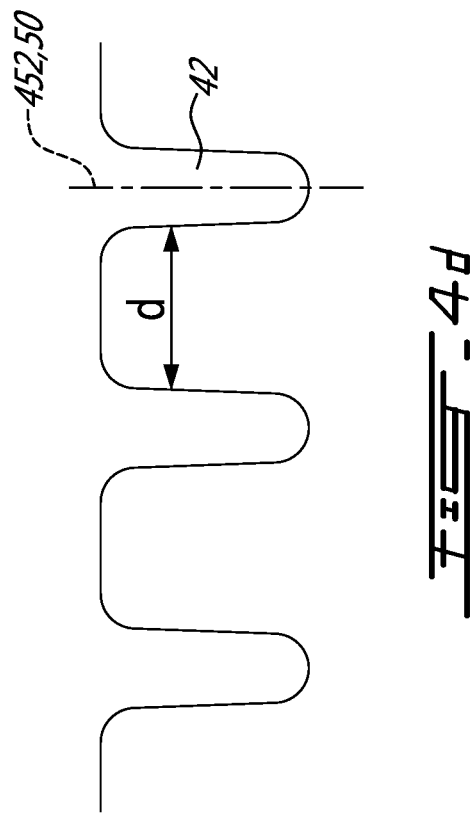
Figure 4C:
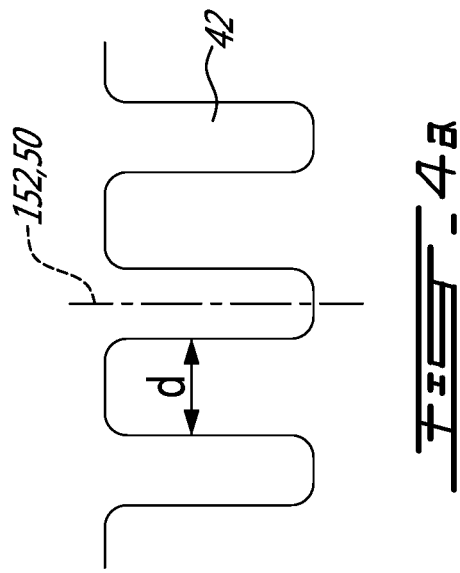
Figure 4D:
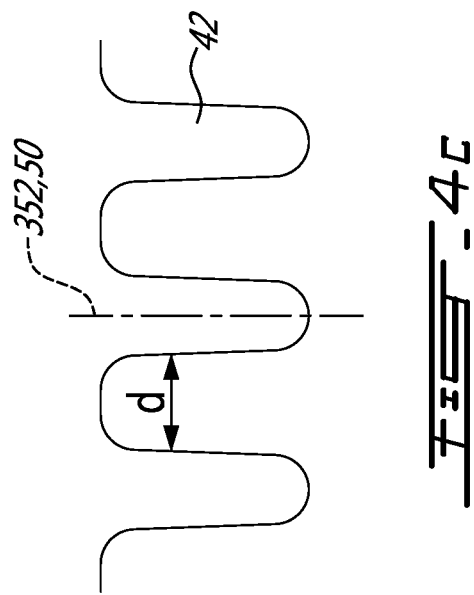

FIG. 3 shows the teeth 42 with a rectangular cross-section; however, alternate shapes are also possible. For example, the teeth 42 may have a more rounded profile, which in a particular embodiment may make it easier to manufacture the inlet wall 32 as a single piece. FIGS. 4a-4d show examples of alternate cross-sections for the teeth 42, shown as extending linearly for improved clarity. FIGS. 4a, 4c and 4d show examples where the radial central axis 152, 352, 452 is straight and extends along the radial direction 50, i.e. intersects the central longitudinal axis 13; each tooth thus extends radially along a direction corresponding to a radial line intersecting the central longitudinal axis 13. FIG. 4b shows an example where the radial central axis 252 is straight and inclined, i.e. extends at a non-zero angle Φ with respect to the radial direction 50. The distance d between the teeth 42 may be similar to the circumferential dimension of the teeth 42, as per FIGS. 4a, 4b and 4c, or significantly greater than the circumferential dimension of the teeth 42, as per FIG. 4d. Any of the cross-sections shown in FIGS. 3, 4a, 4b, 4c and 4d may be used in combination with any of the teeth orientations shown in FIGS. 2a, 2b, 2c. Other configurations and combinations are also possible.

As discussed, the configuration of the inlet 24 may be advantageous when compared to the prior art rounded inlet. In some embodiments, the configuration of the inlet 24 and particularly of the inlet wall portion 32 may allow increased shielding against foreign object damage at the fan blade tips 36 without reducing the open cross-sectional area at the throat. In some embodiments, the configuration of the inlet wall portion 32 may allow increased shielding against foreign object damage at the fan blade tips 36 without reducing the open cross-sectional area along the axial length L of the inlet wall portion 32. In some embodiments, the teeth 42 are inclined and/or curved to block a direct line of sight to the fan blade tips 36 for objects smaller than the distance between the teeth 42. In some embodiments, the teeth 42 are inclined and/or curved to generate pre-swirl in the air reaching the fan blades 22, which may improve performance of the fan 12. In some embodiments the teeth 42 shielding the blade tips 36 of the fan 12 reduce upstream noise transmission and quiet the engine 10.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of shielding tips of fan blades of a gas turbine engine from impact by an object having a predetermined minimum dimension, the method comprising:
    determining a required open cross-sectional area in an air inlet located upstream of the fan blades, the air inlet being defined by an inlet wall surrounding a flow path communicating with the fan blades;
    determining a reference circle having a cross-sectional area corresponding to the required open cross-sectional area;
    offsetting a circumferential part of the inlet wall radially inwardly with respect to the reference circle to define a plurality of circumferentially spaced apart teeth protruding into the reference circle;
    offsetting the remaining circumferential part of the inlet wall radially outwardly with respect to the reference circle to define a plurality of circumferentially spaced apart valleys alternating with the teeth and extending out of the reference circle;
    wherein the teeth are defined spaced apart by a circumferential distance smaller than the predetermined minimum dimension; and
    wherein the teeth and valleys are sized so that a cross-sectional area of a lobed area surrounded by the inlet wall corresponds to the required open cross-sectional area.

2. The method as defined in claim 1, further comprising configuring the teeth and valleys to block a direct line of sight between adjacent ones of the teeth along an axial direction of the engine.

3. The method as defined in claim 2, wherein configuring the teeth and valleys includes defining the teeth to axially extend along a direction forming a non-zero angle with the axial direction of the engine.

4. The method as defined in claim 2, wherein configuring the teeth and valleys includes defining the teeth to be curvilinear along the axial direction of the engine.

5. The method as defined in claim 1, further comprising configuring the teeth so that a circumferential distance between each two circumferentially adjacent ones of the teeth decreases in a flow direction.

6. The method as defined in claim 1, further comprising configuring the teeth so that a circumferential distance between each two circumferentially adjacent ones of the teeth decreases in a radially inward direction relative to a central axis of the gas turbine engine.

7. The method as defined in claim 6, further comprising configuring the teeth so that the circumferential distance between the each two circumferentially adjacent ones of the teeth decreases in a flow direction.

8. The method as defined in claim 1, further comprising configuring the teeth so that a circumferential distance between each two circumferentially adjacent ones of the teeth is constant along a radial direction relative to a central axis of the gas turbine engine and varies along an axial direction relative to the central axis.

9. The method as defined in claim 1, further comprising configuring the teeth so that each of the teeth extends radially relative to a central axis of the gas turbine engine at a non-zero angle with respect to a radial line intersecting the central axis.

10. The method as defined in claim 1, further comprising configuring the teeth so that a circumferential distance between each two adjacent ones of the teeth is greater than a circumferential width of each of the teeth.

11. The method as defined in claim 1, further comprising configuring the teeth so that a circumferential distance between each two adjacent ones of the teeth is equal to a circumferential width of each of the teeth.

12. The method as defined in claim 9, further comprising configuring the teeth so that the non-zero angle varies along an axial length of the teeth relative to the central axis.

13. The method as defined in claim 1, further comprising configuring the teeth so that a cross-section of the teeth taken on a plane normal to a central axis of the gas turbine engine has a rounded edges.

14. The method as defined in claim 4, wherein defining the teeth to be curvilinear along the axial direction of the engine includes defining the teeth to curve in the axial direction and in a circumferential direction parallel to a direction of rotation of the fan blades.

* * * * *